United States Patent [19]
Hayashi et al.

[11] Patent Number: 5,649,094
[45] Date of Patent: Jul. 15, 1997

[54] SELF-SERVICE DIAGNOSTIC UNIT FOR PLURAL FUNCTIONAL DEVICES

[75] Inventors: Toshihide Hayashi, Kanagawa; Koki Tsumori, Tokyo, both of Japan

[73] Assignee: Sony Corporation, Tokyo, Japan

[21] Appl. No.: 662,961

[22] Filed: Jun. 13, 1996

Related U.S. Application Data

[63] Continuation of Ser. No. 935,974, Aug. 27, 1992, abandoned.

[30] Foreign Application Priority Data

Sep. 9, 1991 [JP] Japan ................. 3-255880

[51] Int. Cl.$^6$ ................. G06F 11/30; G06F 13/12
[52] U.S. Cl. ................. 395/183.06; 395/183.07; 364/580
[58] Field of Search ................. 395/183.01, 183.06, 395/184.01, 183.07; 371/20.1; 364/550, 160, 186, 183, 130, 131, 132, 138, 139, 580

[56] References Cited

U.S. PATENT DOCUMENTS

| | | | |
|---|---|---|---|
| 4,275,464 | 6/1981 | Schmidt | 371/29.1 |
| 4,322,846 | 3/1982 | Carroll et al. | 371/16.1 |
| 4,456,809 | 6/1984 | Jones et al. | 219/108 |
| 4,499,581 | 2/1985 | Miazga et al. | 371/20.1 |
| 4,500,951 | 2/1985 | Sugimoto et al. | 371/29.1 |
| 4,542,508 | 9/1985 | Moore | 371/29.1 |
| 4,701,870 | 10/1987 | Mogi et al. | 364/58 |
| 4,805,085 | 2/1989 | Mogi et al. | 364/132 |
| 5,142,536 | 8/1992 | Akao et al. | 371/18 |
| 5,228,139 | 7/1993 | Miwa et al. | 395/275 |

*Primary Examiner*—Hoa T. Nguyen
*Attorney, Agent, or Firm*—Hill, Steadman & Simpson

[57] ABSTRACT

An electronic apparatus is adapted for realizing desired functions by combining a number of functional devices, in which the trouble states of the functional devices may be identified speedily and positively by virtue of its self-diagnostic function. Control data are periodically transmitted from a system controller 41 connected over an I$^2$ bus for operating the functional devices, such as a video processing circuit 33 or an audio processing circuit 37. The functional devices are checked for malfunctions at each control cycle of transmitting the control data from the system controller to the functional devices for collectively displaying the checked results of malfunctions of the functional devices during the self-diagnostic mode operation.

4 Claims, 3 Drawing Sheets

SELF-SERVICE DIAGNOSTIC UNIT FOR PLURAL FUNCTIONAL DEVICES

This is a continuation of application Ser. No. 07/935,974, filed Aug. 27, 1992, now abandoned.

DETAILED DESCRIPTION OF THE INVENTION

1. Field of the Invention

This invention relates to an electronic apparatus in which a system controller and plural functional devices are interconnected by an inner bus. More particularly, it relates to an electronic apparatus having a self-diagnostic function of judging malfunctions of various functional devices by the system controller.

2. Prior Art

As the micro-computers have become popular, a variety of electronic apparatus having the micro-computer loaded therein have been put to practical use. In the electronic equipment, having the micro-computers loaded therein, the micro-computers are used as, for example, the system controller, and plural functional devices, controlled by the system controller, are combined to realize desired functions.

As inner buses for interconnecting the system controller and the functional devices, there are known I²C buses and home buses, as typical examples.

On the I²C buses, data and clocks are transmitted over two lines via a data line SDA and a clock line SCL. A response acknowledge (ACK) bit is provided at every eighth bit, as shown from an MSB first 8-bit transfer format conforming to the above-mentioned I²C bus format shown in FIG. 7, in which data transfer is started by a start condition S and terminated by a stop condition P.

Figure 7:
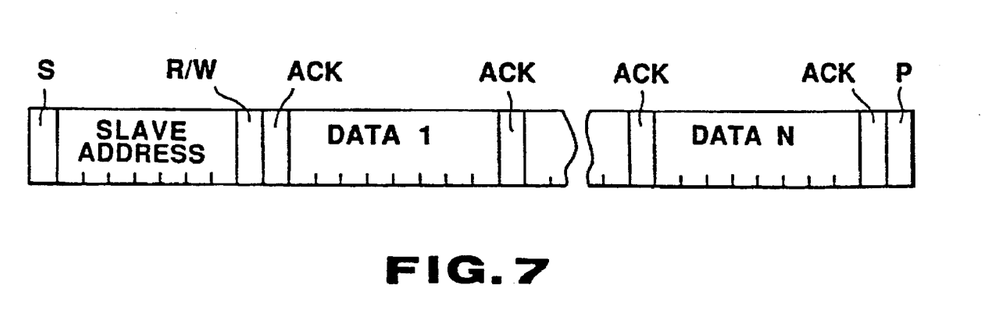
FIG. 7 shows an 8-bit MSB first transfer format conforming to the I²C bus format.

The start condition S and the stop condition P are afforded by a master side device, such that the start condition S is afforded, when the data line SDA is transferred from logic "H" to logic "L" while the clock line SCL is in the state of logic "H" and the stop condition P is afforded when the data line SDA is transferred from logic "L" to logic "H" while the clock line SCL is in the state of logic "H". The seven bits following the start condition S is a slave address, and a bit following the slave address is defined as a read/write (R/W) selecting bit. The ACK bit is directly followed by MSB first transmission/reception data. The data are fetched by the rising edge of a clock transmitted over clock line SCL. By the ACK bit being set to the logic "L" by the slave side device at every eighth bit, the master side device may realize if data could have been received by the slave side device.

In an electronic equipment in which the system controller is connected to plural functional devices over the inner buses, such as I²C buses, it is possible to make trouble diagnosis of the functional devices based on the response data and ACK bits transmitted from the functional devices, that is slave side devices, to the system controller, that is master side devices. Heretofore, for carrying out trouble diagnosis of these types of the electronic apparatus, the functional devices were separately checked to see whether or not the particular apparatus is in trouble.

Since heretofore the functional devices were individually checked to see whether or not the particular equipment is in trouble, for carrying out trouble diagnosis of electronic equipment, it is necessary with electronic equipment adapted for carrying out desired functions by combining a large number of functional devices to carry out trouble diagnosis based on estimation of the sites of troubles, while a labor- and time-consuming operation is usually required in locating the functional device which is actually in trouble. In the case of troubles which occur intermittently, it has been extremely difficult to locate the functional device which is in trouble.

SUMMARY OF THE INVENTION

In view of the above-described status of the art, it is an object of the present invention to provide an electronic equipment in which desired functions are adapted to be realized by combining a large number of functional devices, in which trouble diagnosis of the respective functional devices may be effected promptly and reliably.

It is another object of the present invention to provide a television receiver having a self-diagnosis function capable of promptly and reliably carrying out trouble diagnosis of a large number of functional devices promptly and reliably.

It is a further object of the present invention to provide a television receiver in which the results of judgement of troubles of the respective functional devices may be displayed collectively.

It is yet another object of the present invention to enable the functional devices susceptible to intermittent occurrence of troubles to be specified.

According to the present invention, there is provided a an electronic apparatus comprising a plurality of functional devices, a system controller connected to each of said functional devices over an inner bus and adapted for periodically transmitting control data for operating said functional devices, said system controller checking for malfunctions of the functional devices based on response data to said control data transmitted thereto and outputting the results of check of the malfunctions of the functional devices upon request, and a display for displaying the results of check of the malfunctions of the functional devices putted out by said system controller.

The electronic apparatus according to the present invention includes a system controller connected over an inner bus to plural functional devices. Control data are periodically transmitted from the system controller for operating the functional devices. These functional devices are checked for troubles by the system controller based on response data to the transmitted control data at each control cycle of transmitting the control data to the functional devices in their entirety. Results of check of the malfunctions are putted out upon request.

The electronic apparatus according to the present invention includes a system controller connected over an inner bus to plural functional devices. The system controller periodically transmits the control data for operating the functional devices, while checking for troubles of the functional devices based on the response data to the transmitted control data at each control cycle of transmitting the control data to the functional devices in their entirety to output the results of check of the malfunctions of the functional devices upon request.

The above and other objects and novel features of the present invention will become apparent from reading the following description based on the accompanying drawings and the new matter pointed out in the claims.

DESCRIPTION OF THE PREFERRED EMBODIMENT

Referring to the drawings, an electronic equipment according to a preferred embodiment of the present invention will be explained in detail.

Figure 1:
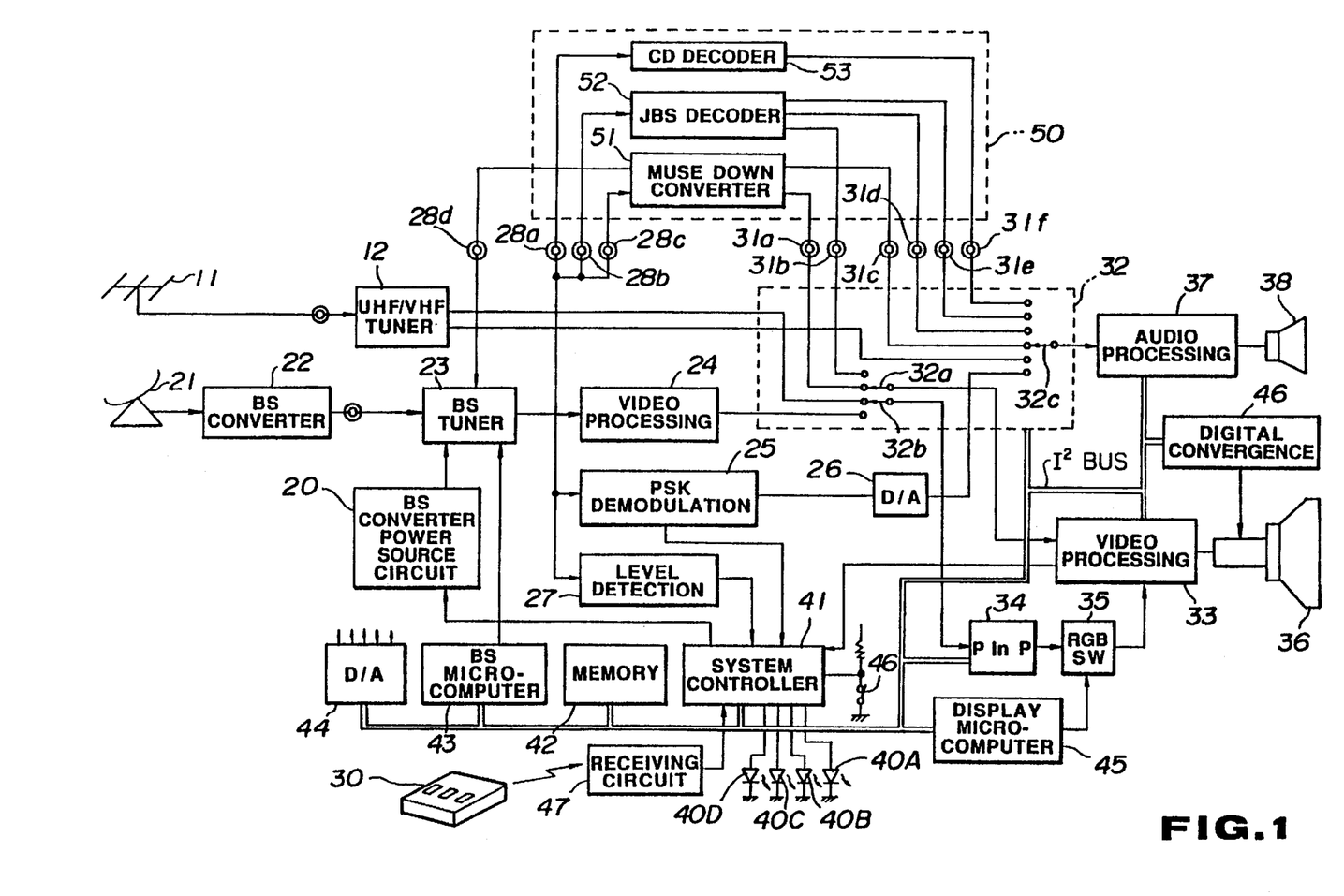
FIG. 1 is a block diagram showing a circuit constitution of a television receiver to which the present invention is applied.

The electronic apparatus or equipment according to the present invention is arranged as shown for example in FIG. 1.

In the present embodiment, the circuit construction of which is shown in FIG. 1, the present invention is applied to a television receiver having enclosed therein a VHF/UHF tuner 12 for receiving ground broadcasting, a BS tuner 23 for receiving satellite broadcasting and a BS converter power circuit 20 for supplying the electric power to a BS converter 22 for receiving satellite broadcasting externally connected to the BS tuner 23. The station selecting output by the VHF/UHF tuner 12 and the BS tuner 23 or the decoding output by the decoder 50 are outputted at a speaker 38, while an image display by color television signals is effected by a Braun tube 36.

In the present television receiver, the VHF/UHF tuner for receiving ground broadcasting 12 functions as a ground broadcasting receiver for selecting desired channel signals from VHF or UHF ground broadcast signals for reproducing color television signals and audio signals conforming to the NTSC system. For example, a VHF/UHF antenna 11, comprised e.g. of so-called Yagi-Uda antenna, is connected externally to the tuner 12. The VHF/UHF tuner 12 is designed to select signals of a desired channel from ground broadcast signals, received via VHF/UHF antenna 11, and to process the signals of the selected channel by amplification or detection to reproduce color television signals and audio signals. The color television signals and audio signals of the channel selected by the VHF/UHF tuner 12 are supplied via an AV switch 32 and a video processing circuit 33 to the Braun tube 36 and via AV switch 32 and audio processing circuit 37 to the speaker 38, respectively.

The BS tuner for receiving satellite broadcasting 23 functions as a satellite broadcasting receiver for selecting signals of a desired channel from satellite broadcasting by a broadcasting satellite (BS broadcasting) or satellite broadcasting by a communication satellite (CS broadcasting) for reproducing color television signals and audio signals conforming to the NTSC system, and a BS converter 22 for receiving satellite broadcasting, connected to a BS antenna 21, such as a so-called parabola antenna, is connected externally to the tuner 23 via a coaxial cable not shown.

The BS converter 22 is adapted for receiving signals of the 12 GHz range, received as weak electric waves from the broadcasting satellite (BS) or communication satellite (CS), via the BS antenna 21, amplifying the received signals, frequency-converting the received signal into BS-IF signals in the range of 1 GHz and supplying the BS-IF signals to the BS tuner 23.

It is noted that the television receiver of the present embodiment constitutes a satellite broadcasting receiving system for individual reception and is so designed that a driving power is supplied from a power source of the BS converter 20 via the coaxial cable to the BS tuner 23 for driving the BS tuner 23. The power source of the BS converter 20 has its operation controlled by a system controller 41 and is adapted to be switched between the power source on state and a power source off state depending on the setting of a power source switch for BS converter 46 connected to the system controller 41. With the satellite broadcasting reception system for individual reception, as in the present embodiment, the BS converter power switch 46 is set so that the power source circuit for BS converter 20 is in the power source on state. With the satellite broadcasting reception system for community reception, the BS converter power switch 46 is set so that the power source circuit for BS converter 20 is in the power source off state.

The BS tuner 23 is adapted for selecting signals of a desired channel, such as BS 3-channel (NIPPON EISEI HOSO), a BS 11-channel (NHK) or a desired channel of the CS broadcasting, from the BS-IF signals frequency-converted by the BS converter 22, processing the signals of the selected channel by e.g. automatic gain control (AGC), IF amplification, frequency modulation (FM), deemphasis or elimination of energy dispersion and for reproducing video signals and audio signals processed by so-called phase shift keying modulation and pulse code modulation (PCM audio signals).

The video signals and the PCM audio signals of the channel selected by the BS tuner 23 are supplied via external output terminals 28a to 28c to the external decoder 50, while the video signals and the PCM audio signals are supplied to a video processing circuit 24 and to a PSK demodulator 25, respectively.

The video signals of the channel selected by the BS tuner 23 are converted by video processing circuit 24 into color television signals conforming to the NTSC system. The color television signals from the video processing circuit 24 are supplied from video processing circuit 33 to the Braun tube 36 via AV switch 32.

The PSK demodulator 25 demodulates the PSK modulated PCM audio signals of the channel selected by the BS tuner 23 to reproduce PCM audio signals as well as to detect the scrambled state of the PCM audio signals. The PCM audio signals, demodulated by the PSK demodulator 25, are converted by a digital-to-analog (D/A) converter 26 into analog audio signals. The audio signals produced by the D/A converter 26 are supplied via AV switch 32 to the speaker 38 from the audio processing circuit 37. Detection signals from the PSK demodulator 25, indicating the scrambled state of the PCM audio signals, are supplied to system controller 41.

The station-selecting output by the BS tuner 23 is supplied to a level detection circuit 27. The level detection circuit 27 detects the reception level of the BS antenna 21, that is the antenna level, based on the signal level of, for example, an 8 MHz band of the station selecting output by the BS tuner 23. The detection signal from the level detection circuit 27, indicating the antenna level, is supplied to the system controller 41.

The function of the external decoder 50 is to convert signals from the BS tuner 23 into unscrambled color television signals and unscrambled audio signals in conformity to the NTSC system when the satellite broadcasting is a so-called high-vision broadcasting program or a chargeable broadcasting program, that is when the received signals are RUSE signals or scrambled signals, respectively The external decoder 50 is made up of a RUSE down converter 51 connected to an external output terminal 28c and external input terminals 28d, 31a and 31c, a JSB decoder 52 connected to an external output terminal 28b and external input terminals 31b, 31d and 31e and a CS decoder 53 connected to an external output terminal 28a and an external input terminal 31f.

In the reception mode of the MUSE signals, the MUSE down converter 51 transmits so-called keyed AFC pulses to the BS tuner 23 via the external input terminal 28d and decodes the MUSE signals supplied from BS tuner 23 via the external output terminal 28c to reproduce high-vision video signals before converting the high-vision signals into color television signals conforming to NTSC system. The MUSE down converter also reproduces so-called DPCM audio near-instantaneous compressed and expanded audio signals time division multiplexed during the vertical blanking period. The color television signals and audio signals, obtained by the MUSE down-converter 51, are supplied from the external input terminals 31a, 31c to the AV switch 32, that is, the color television signals are supplied from video processing circuit 33 via audio switch 32 to the Braun tube 36, while the audio signals are supplied from video processing circuit 37 via AV switch 32 to the speaker 38.

The JSB decoder 52 descrambles the scrambled signals supplied from BS tuner 23 via the external output terminal 28b to reproduce the color television signals, while demodulating the PSK modulated and scrambled PCM audio signals frequency division multiplexed on video signals and descrambling the scrambled PCM audio signals for reproducing the audio signals. The color television signals and audio signals obtained from the JSB decoder 52 are supplied from the external input terminals 31b, 31d and 31e to the AV switch 32, that is, the color television signals are supplied from the video processing circuit 33 via AV switch 3 to the Braun tube 36, while the audio signals are supplied from audio processing circuit 37 via AV switch 32 to the speaker 38.

The CS decoder 53 demodulates the PSK modulated and scrambled PCM audio signals, supplied from BS tuner 23 via external output terminal 28a, and descrambles the scrambled PCM audio signals to reproduce audio signals. The audio signals obtained by the CS decoder 53 are supplied from the external input terminal 31f to the AV switch 32, while being supplied from audio processing circuit 37 via V switch 32 to the speaker 38.

The AV switch 32 is made up of a changeover switch 32a for changing over the color television signals supplied to video processing circuit 33, a changeover switch 32b for changing over color television signals supplied to a picture-in-picture (P in P) circuit 34 and a changeover switch 32c for changing over audio signals supplied to the audio processing circuit 37.

The changeover switch 32a selects one of color television signals supplied from MUSE down converter 51 and JSB decoder 52 via external input terminals 31a, 31b, respectively, and color television signals from the VHF/UHF tuner 12 and video processing circuit 24, and transmits the selected color television signals to the video processing circuit 32. The changeover switch 32b selects one of color television signals supplied from MUSE down converter 51 and JSB decoder 52 via external input terminals 31a, 31b, respectively, and color television signals from the VHF/UHF tuner 12 and video processing circuit 24, and transmits the selected color television signals to the picture-in-picture circuit 34. The changeover switch 32c selects one of audio signals supplied from MUSE down converter 51, JSB decoder 52 and CS decoder 53 via external input terminals 31c to 31f and audio signals from VHF/UHF tuner 12 and D/A converter 26 to transmit the selected audio signals to the audio processing circuit 37.

The video processing circuit 33 includes a video amplification circuit and a color signal reproducing circuit and converts the color television signals selected by the AV switch 32 into so-called RGB signals which are supplied to the Braun tube 36. The video processing circuit 33 also detects whether the color television signals selected by the AV switch 32 are color television signals conforming to the NTSC system to transmit the detected signals to the system controller 41.

The picture-in-picture (P in P) circuit 34 is adapted for performing a picture-in-picture processing for displaying the color television signals selected by the AV switch 32 on a slave screen surfaces, and transmits RGB signals for display on the slave screen surface to the video processing circuit 33 via RGB switching circuit 35. The RGB switching circuit 35 selects one of the RGB signals from the P in P circuit 34 for slave picture display and RGB signals supplied from a display microcomputer 45 controlled by system controller 41 for displaying the antenna level or the operating contents and transmits the selected signals to the video processing circuit 33. The images of the selected channel are displayed on the Braun tube 36, while the voice of the selected channel is outputted via speaker 38, under control of the system controller 41. The P in P display, display of the states of the television receiver, such as the antenna level or the operating contents or menu such as the operating sequence, are displayed, as the occasion may require.

The AV switch 32, video processing circuit 33, P in P circuit 34, audio processing circuit 37 and a display microcomputer 45 are connected to the system controller 41 via $I^2$ bus. A memory 42, a BS micro-computer 43, D/A converter 44 and a digital convergence (D-CONV) circuit 46 are also connected to system controller 41 via $I^2$ bus. The system controller 41 periodically transmits control data over $I^2$ bus to the AV switch 32, video processing circuit 33, P in P circuit 34, audio processing circuit 37, display microcomputer 45, memory 42, a BS micro-computer 43, D/A converter 44 and a digital convergence (D-CONV) circuit 46 for controlling these components to the operating states in accordance with the control data. The functional devices, such as the D/A converter 44 or the D-CONV circuit 46, are refreshed by control data periodically transmitted from system controller 41 over $I^2$ bus for performing operations in accordance with the control data.

The memory 42 is e.g. a non-volatile memory for storing a program of the control menu. The BS micro-computer 43 controls station selection of the BS tuner 23 based on data from system controller 41. The D/A converter 44 converts data from system controller 41 into analog signals for controlling a dial for adjusting e.g. the sound volume. The D-CONV circuit 46 controls deflection of the Braun tube 36 based on data from system controller 41.

A reception circuit 47 for receiving control signals from a remote controller 30 is connected to system controller 41. The system controller 41 controls various operating parts based on control signals from an operating panel provided on the front side of the television receiver and the remote controller 30, scrambled states of video signals from PSK demodulator 25 and PCM audio signals, reception levels from the level detection circuit 27 and the presence or absence of color television signals from video processing circuit 33.

If the user sets the BS 7-channel, in accordance with an operation performed by the user using the remote controller 30, system controller 41 controls various operating parts for selecting the BS 7-channel of satellite broadcasting to display the images of the selected channel on the Braun tube 36 and outputting the voice of the channel from speaker 38. If the user performs the so-called Pin P operation, system controller 41 controls the AV switch 32 and the P in P circuit 34 so that, for example, the BS broadcasting program is displayed on the master screen surface and the ground broadcasting program is displayed on the slave screen surface. On the other hand, if the user performs a menu display operation, system controller 41 controls the display micro-computer 45 for displaying the sequence of recording the BS broadcasting, for example, on the slave screen surface in accordance with a menu system.

Specifically, if the user sets the channel number, using the remote controller 30, for viewing a program of a desired channel of the ground broadcasting, system controller 41 receives the control signal from remote controller 30 indicating the channel number and controls the VHF/UHF tuner 12 for selecting the signals of the set channel number while controlling the changeover switches 32a, 32c of the AV switch 32 for selecting the color television signals and audio signals from the VHF/UHF tuner 12. The selected color television signals are supplied to the video processing circuit 33, while audio signals are supplied to the audio processing circuit 37.

The video processing circuit 33 converts the color television signals from AV switch 32 into RGB signals to supply the converted signals to the Braun tube 36, while the audio processing circuit 37 processes audio signals from AV switch 32 with sound quality adjustment etc. for supplying the processed audio signals to speaker 38. Thus the user may view the program of the desired channel of the ground broadcasting.

The system controller 41 also transmits data indicating the operating menu, such as set channel number, to the display micro-computer 45 over I² bus, so that the user may be able to confirm the operating menu, such as the set channel number. Based on these data, the display micro-computer 45 transmits RGB signals for displaying the channel number at an upper right corner of the screen to the video processing circuit 33 via RGB switch 35. The video processing circuit 33 converts color television signals from AV switch 32 into RGB signals and multiplexes the RGB signals from RGB switch 35 to the RGB signals converted from the color television signals for superimposition. The result is that the channel number is displayed in superimposition on the picture of the ground broadcasting program.

If then the user sets the BS 11-channel, using the remote controller 30, in order to view the program of the desired channel of the BS broadcasting, the system controller 41 receives the control signal indicating the channel number from the remote controller 30 via reception circuit 47 and controls the BS tuner 23 for selecting the signals of the set channel, while detecting whether the current program is the ordinary broadcasting program conforming to the NTSC system or the high vision broadcasting program based on step-out of the PCM audio signals from, for example, the PSK demodulator 25, and the reception level from the level detection circuit 27. If the current program is the ordinary broadcasting program, the system controller 41 controls the AV switch 32 for selecting the color television signals from video processing circuit 24 and the audio signals from D/A converter 26. If the current program is the high vision broadcasting program, system controller 41 controls the AV switch 32 for selecting the audio signals and color television signals from MUSE down converter 51.

That is, audio signals of the ordinary broadcasting program are converted into PCM audio signals, while being PSK modulated and frequency division multiplexed on video signals, while audio signals of the high-vision broadcasting program are converted into DPCM audio near-instantaneous compressed and expanded signals, while being time division multiplexed during the vertical blanking period. The system controller 41 assumes the current program to be an ordinary broadcasting program if the state of reception is good, that is if the reception level detected by the level detection circuit 27 is high and the PCM audio signals are synchronized in the PSK demodulator 25. On the contrary, the system controller 41 assumes the current program to be a high-vision broadcasting program if the reception level is high and the PCM audio signals are not synchronized in the PSK demodulator 25. If the current program is the ordinary broadcasting program, system controller 41 controls the changeover switches 32a, 32c of the AV switch 32 for selecting the color television signals from the video processing circuit 24 and the audio signals from D/A converter 32. If the current program is the high-vision broadcasting program, system controller 41 controls the changeover switches 32a, 32c of the AV switch 32 for selecting the audio signals and color television signals from the MUSE down converter 51. Meanwhile, discrimination between the ordinary broadcasting program and the high-vision broadcasting program may be made depending on the presence or absence of keyed AFC pulses supplied from the MUSE down converter 51 to the BS tuner 23 via the external input terminal 28d.

The selected color television signals are supplied to the video processing circuit 33, while audio signals are supplied to the audio processing circuit 37. Thus the user may view the ordinary broadcasting program or the high-vision broadcasting program, simply by setting the desired channel, irrespective of the kinds off the BS broadcasting program, such as the ordinary broadcasting program or the high-vision broadcasting program.

The high-vision broadcasting program is broadcast on the same channel as that of the ordinary broadcasting program using different time zones. Based on, for example, the presence or absence of the keyed AFC pulses, or the step-out between the reception level and the PCM audio signals, it is checked if the currently received broadcasting program is the ordinary broadcasting program or the high-vision broadcasting program. If the current broadcasting program is the ordinary broadcasting program, control is so made as to select the color television signals from the video processing circuit 24 and the audio signals from the D/A converter 26. If the current broadcasting program is the high-vision broadcasting program, control is so made as to select audio signals and color television signals obtained by decoding by the externally connected MUSE down converter 51. In this manner, the user is able to view the ordinary broadcasting program or the high-vision broadcasting program, irrespective of the types of the BS broadcasting programs, by a simplified operation of setting the BS tuner 23 to a desired channel.

If the user performs the operation of displaying a picture of the ground broadcasting program on a slave screen surface, by acting on the remote controller 30, while he is viewing the BS broadcasting program as described above, system controller 41 receives control signals associated with the picture-in-picture operation from remote controller 30 and controls the VHF/UHF tuner 12 for selecting signals of the set channel of the ground broadcasting program, while controlling the changeover switch 32b of the AV switch 32 for selecting the color television signals from the VHF/UHF tuner 12. The selected color television signals are supplied to the P in P circuit 34. The P-in-P circuit 34 converts the color television signals into RGB signals and transmits the RGB signals to the video processing circuit 33 via the RGB switch 35 as signals of the slave picture. The result is that the user is able to view the BS broadcasting program, for example, as a master picture and the ground broadcasting program as a slave picture.

If the user sets, for example, the BS 3-channel, using the remote controller 30, in order to view the program of a desired channel in the BS broadcasting, the system controller 41 receives a control signal indicating the channel number from remote controller 30 via the reception circuit 47, while controlling the BS tuner 23 for selecting signals of the set channel and detecting, on the basis of, for example, the scrambled state of the PCM audio signals from PSK demodulator 25, whether the current program is the unscrambled charge-free broadcasting program or the chargeable scrambled broadcasting program. If the current program is the charge-free broadcasting program, system controller 41 controls the AV switch 32 for selecting color television signals from video processing circuit 24 and audio signals from D/A converter 26. If the current program is the chargeable broadcasting program, system controller 41 controls the AV switch 32 for selecting audio signals and color television signals from JSB decoder 52.

That is, the audio signals of the charge-free broadcasting program are converted into PCM audio signals, while being PSK modulated and frequency division multiplexed to video signals. On the other hand, the audio signals of the chargeable broadcasting program are converted into PCM audio signals and scrambled and the scrambled signals are PSK modulated and frequency division multiplexed to video signals. The system controller 41 discriminates if the current broadcasting program is the chargeable broadcasting program or the charge-free broadcasting program, on the basis of the 8th bit of the so-called range bits indicating the scrambled state of the PCM signals detected by PSK demodulator 25. If the current program is the charge-free broadcasting program, system controller 41 controls changeover switches 32a, 32c of the AV switch 32 for selecting the color television signals from video processing circuit 24 and audio signals from D/A converter 26. On the other hand, if the current broadcasting program is the chargeable broadcasting program, system controller 41 controls changeover switches 32a, 32c of the AV switch 32 for selecting the audio signals and color television signals from JSB decoder 52. It is noted that discrimination between the chargeable and charge-free broadcasting programs may also be made on the basis of the 12th bit of the so-called control bits of the PCM audio signals indicating the scrambled state of video signals.

The selected color television signals are supplied to the video processing circuit 33, while audio signals are supplied to the audio processing circuit 37. Thus the user may view the charge-free broadcasting program or the chargeable broadcasting program, simply by setting the desired channel, irrespective of the kinds of the BS broadcasting program, that is, irrespective of whether or not the signals of the program are previously scrambled.

If the user sets, for example, a CS channel, using the remote controller 30, in order to listen to music of a desired channel in the BS broadcasting, the system controller 41 receives a control signal indicating the channel number from remote controller 30 via the reception circuit 47, while detecting, on the basis of, for example, the scrambled state of the PCM audio signals from PSK demodulator 25, whether the current music program is the unscrambled charge-free broadcasting program or the chargeable scrambled broadcasting program. If the current program is the charge-free broadcasting program, system controller 41 controls the AV switch 32 for selecting audio signals from D/A converter 26. If the current program is the chargeable broadcasting program, system controller 41 controls the AV switch 32 for selecting audio signals from CS decoder 52.

That is, the audio signals of the charge-free broadcasting program are converted into PCM audio signals, while being PSK modulated and frequency division multiplexed, as described above. On the other hand, the audio signals of the chargeable broadcasting program are converted into PCM audio signals and scrambled and the scrambled signals are PSK modulated and processed by frequency division multiplexing. The system controller 41 discriminates if the current broadcasting program is the chargeable broadcasting program or the charge-free broadcasting program, on the basis of the 8th bit of the so-called range bits indicating the scrambled state of the PCM signals detected by PSK demodulator 25. If the current program is the charge-free broadcasting program, system controller 41 controls changeover switch 32c of the AV switch 32 for selecting the audio signals from D/A converter 26. On the other hand, if the current broadcasting program is the chargeable broadcasting program, system controller 41 controls changeover switch 32c of the AV switch 32 for selecting the audio signals from CS decoder 53.

The selected audio signals are supplied to the audio processing circuit 37, as a result of which the user may view the charge-free broadcasting program or the chargeable broadcasting program, simply by setting the desired channel, irrespective of the kinds of the BS broadcasting program, that is, irrespective of whether or not the current program is the charge-free program or chargeable program.

In the present television receiver, system controller 41 performs the following self-diagnostic operation if the self-diagnosis mode is set.

Figure 2:
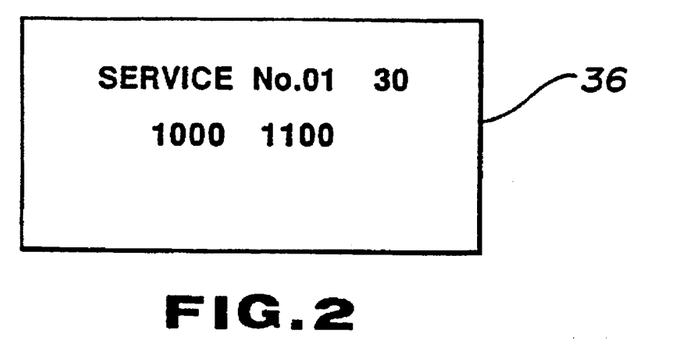
FIG. 2 shows a state of display on a tube surface under a service mode in the television receiver shown in FIG. 1.
Figure 3:
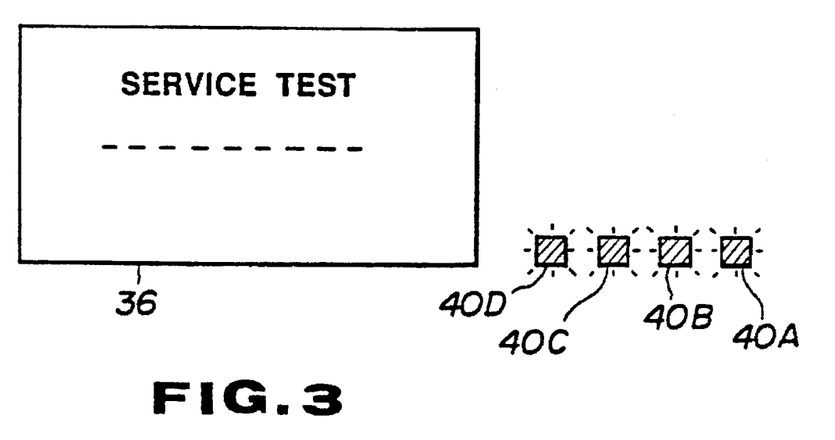
FIG. 3 shows a state of display on a tube surface of the start picture of the self-diagnosis mode and the state of display by the turning on and off of light emitting diodes in the television receiver shown in FIG. 1.

That is, when the system controller 41 accepts a predetermined service code, by the operation of the operating input means or the remote controller 30, system controller 41 enters into a service mode, and controls the display micro-computer 45 for displaying a picture of the service mode, such as is shown in FIG. 2, on the Braun tube 36. When the system controller 41 accepts the operating input signals of, for example, a sleeve key, during the service mode, system controller 41 enters into the self-diagnostic mode, and controls the display micro-computer 45 for displaying a picture of the self-diagnostic mode, shown for example in FIG. 3, while flashing first to fourth light-emitting diodes 40A, 40B, 40C and 40D.

During the self-diagnostic mode, system controller 41 periodically transmits control data to functional devices, such as D/A converter 44 or D-CONV circuit 46, over I² bus, as described previously, for causing the functional devices to be operated in accordance with the control data. On the other hand, at each control cycle of transmitting the control data to the functional devices in their entirety, system controller 41 checks for malfunctions of the functional devices on the basis of response data to the transmitted control data, that is return data and ACK information transmitted from the functional devices over I² bus, and controls the display on the Braun tube 36 through the display micro-computer 45 while controlling the flashing of the light-emitting diodes 40A to 40D.

Thus, in the self-diagnostic mode, system controller 41 checks for malfunctions of the AV switch 32, picture-in-picture circuit 34, display micro-computer 45, D/A converter 44 and D-CONV circuit 46, based on the ACK information transmitted from these functional devices over I² bus at each control cycle. The system controller also checks for malfunctions of the memory 42, video processing circuit, 33, P-in-P circuit 34, audio processing circuit 37 and BS micro-computer 43, based on the return data transmitted from these functional devices over I² bus at each control cycle.

Figure 5:
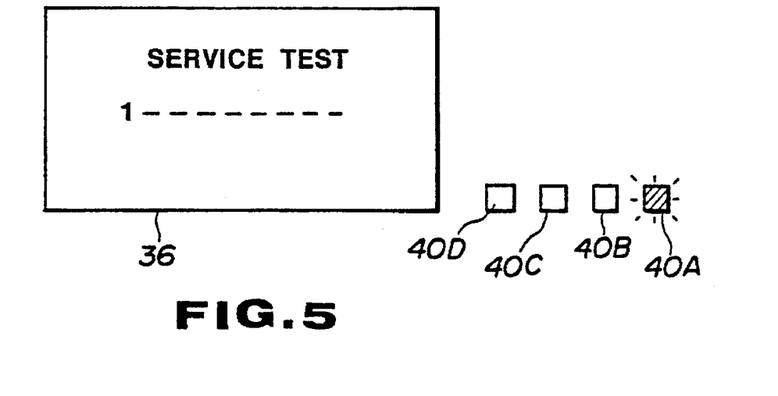
FIG. 5 shows a state of display on a tube surface in the case of the judgement that the memory is in trouble in the self-diagnosis mode and the state of display by the turning on and off of light emitting diodes in the television receiver shown in FIG. 1.

If, as a result of check for malfunctions of the functional devices in the above-described self-diagnostic mode, the memory 42, for example, is found to be in trouble, system controller 41 causes a number "1" indicating the trouble of the memory 42 to be displayed on the Braun tube 36, while flashing the first light-emitting diode 40A of the standby-sleeve setting display, as shown in FIG. 5. If the video processing circuit 33 is found to be in trouble, system controller 41 causes a number "2" indicating the trouble of the video processing circuit 33 to be displayed on the Braun tube 36, while flashing the second light-emitting diode 40B for program appointment setting display. If the audio processing circuit 37 is found to be in trouble, system controller 41 causes a number "3" indicating the trouble of the audio processing circuit 37 to be displayed on the Braun tube 36, while flashing the first and second light-emitting diode 40A, 40B simultaneously. If the P-in-P circuit 33 is found to be in trouble, system controller 41 causes a number "4" indicating the trouble of the P-in-P circuit 34 to be displayed on the Braun tube 36, while flashing the third light-emitting diode 40C for BS power source on display. If the BS micro-computer 43 is found to be in trouble, system controller 41 causes a number "5" indicating the trouble of the BS micro-computer 43 to be displayed on the Braun tube 36, while flashing the first and third light-emitting diode 40A, 40C simultaneously. If the D-CONV circuit 46 is found to be in trouble, system controller 41 causes a number "6" indicating the trouble of the D-CONV circuit 46 to be displayed on the Braun tube 36, while flashing the second and third light-emitting diode 40B, 40C simultaneously. If the AV switch 32 is found to be in trouble, system controller 41 causes a number "7" indicating the trouble of the AV switch 32 to be displayed on the Braun tube 36, while flashing the first to third light-emitting diode 40A, 40B and 40C simultaneously. If the display micro-computer 45 is found to be in trouble, system controller 41 causes a number "8" indicating the trouble of the display micro-computer 45 to be displayed on the Braun tube 36, while flashing the fourth light-emitting diode 40D for BS timer on display. If the D/A converter 44 is found to be in trouble, system controller 41 causes a number "9" indicating the trouble of the D/A converter 44 to be displayed on the Braun tube 36, while flashing the first to fourth light-emitting diodes 40A and 40D simultaneously.

Figure 6:
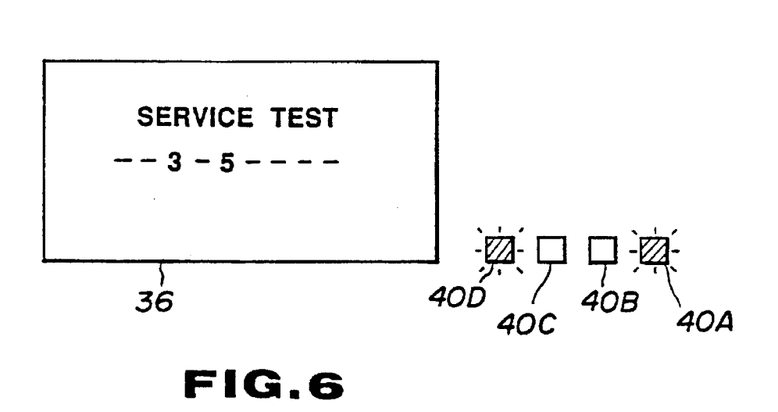
FIG. 6 shows a state of display on a tube surface in the case of the judgement that the audio processor and the BS micro-computer are in trouble in the self-diagnosis mode and the state of display by the turning on and off of light emitting diodes in the television receiver shown in FIG. 1.

If plural functional devices are found to be in trouble, system controller 41 causes the numbers of the functional devices to be displayed unexceptionally on the Braun tube 36, while flashing the first to fourth light-emitting diodes 40A to 40D for indicating the trouble of the functional device bearing a junior number. That is, if the audio processing circuit 37 and the BS micro-computer 43 are found to be in trouble, the number "3" indicating the trouble of the audio processing circuit 37 and the number "5" indicating the trouble of the BS micro-computer 43 are displayed on the Braun tube 36, while the first and third light-emitting diodes 40A and 40B are flashed for display of the trouble of the audio processing circuit 37.

Figure 4:
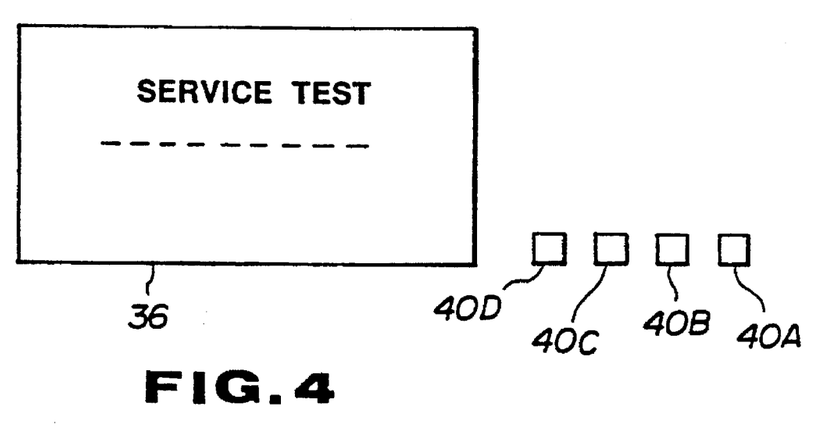
FIG. 4 shows a state of display on a tube surface in the case of the fully satisfactory results of trouble diagnosis of the functional devices in the self-diagnosis mode and the state of display by the turning on and off of light emitting diodes in the television receiver shown in FIG. 1.

In this manner, by collectively indicating the results of the trouble discrimination of the functional devices by combining the display on the Braun tube 36 and flashing of the light-emitting diodes 40A to 40D in the self-diagnostic mode, the states of malfunctions may be checked at a first glance. Moreover, in case of a malfunction in the display on the Braun tube 36, the functional devices in trouble may be positively identified by flashing of the first to fourth light-emitting diodes 40A, 40B, 40C and 40D.

Meanwhile, if the system controller 41 itself is in trouble, such trouble may be identified by the system controller 41 not entering into the self-diagnostic mode. The system controller 41 may be returned to its usual service mode when it again accepts an operating input signal of the sleeve key in the self-diagnostic mode.

It will be appreciated from above that the present invention provides an electronic apparatus provided with a system controller connected over an inner bus to plural functional devices, in which control data are periodically transmitted from system controller to operate the functional devices, and in which the system controller checks for troubles of the functional devices, based on response data to the transmitted control data at each control cycle of transmitting the control data to the functional devices to output the results of trouble discrimination on request, so that the operation of identifying the functional device(s) in trouble may be carried out easily and speedily by this self-diagnostic function and hence the functional devices in trouble may be identified by the self-diagnostic function even in the case of intermittently produced troubles.

Thus the electronic equipment according to the present invention is adapted for realizing desired functions by combining a number of functional devices, in which the trouble states of the functional devices may be identified speedily and positively by virtue of its self-diagnostic function.

What is claimed is:

1. An electronic apparatus comprising:

a plurality of devices for executing individual functions, an inner bus connected to said devices, a system controller connected to each of said functional devices by way of said inner bus for transmitting control data to said devices for operating said devices in their normal mode of operation and for periodically transmitting control data from said system controller over said bus to said devices for operating said devices in a testing mode of operation, said devices producing response data over said bus in response to receiving said control data, said system controller checking for malfunctions in each of the devices based on said response data and outputting the results of checking for malfunctions of the devices upon request, and a display for displaying the results of said check of the malfunctions of each of the devices outputted by said system controller.

2. The electronic apparatus as defined in claim 1, wherein said devices include a tuner, a controller controlling said tuner, an audio processing circuit and a video processing circuit both connected to said tuner, a Braun tube having a screen, and connected to said video processing circuit whereby a picture corresponding to video signals outputted from said video processing circuit is displayed on said screen of said Braun tube.

3. The electronic apparatus as defined in claim 1 wherein said display includes a display controller for causing results of check of the malfunctions of the devices outputted from said system controller to be displayed on said Braun tube.

4. The electronic apparatus as defined in claim 1, wherein said display includes a video display as one of said plurality of devices and a plurality of light-emitting diodes for displaying the results of check of the malfunctions of the devices by flashing.

* * * * *